United States Patent
Bao et al.

(10) Patent No.: US 9,894,213 B2
(45) Date of Patent: *Feb. 13, 2018

(54) ACOUSTIC ECHO CANCELLATION FOR AUDIO SYSTEM WITH BRING YOUR OWN DEVICES (BYOD)

(71) Applicant: Cisco Technology, Inc., San Jose, CA (US)

(72) Inventors: Feng Bao, Sunnyvale, CA (US); Subrahmanyam Venkata Kunapuli, Fremont, CA (US); Fei Yang, San Jose, CA (US); Tor A. Sundsbarm, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/073,799

(22) Filed: Mar. 18, 2016

(65) Prior Publication Data

US 2016/0205262 A1 Jul. 14, 2016

Related U.S. Application Data

(63) Continuation of application No. 13/967,687, filed on Aug. 15, 2013, now Pat. No. 9,319,532.

(51) Int. Cl.
*A61F 11/06* (2006.01)
*H04M 9/08* (2006.01)
(Continued)

(52) U.S. Cl.
CPC ......... *H04M 9/082* (2013.01); *G10K 11/1786* (2013.01); *H04M 3/568* (2013.01);
(Continued)

(58) Field of Classification Search
CPC .. H04M 9/082; H04M 1/6041; H04M 1/7253; H04M 3/568; H04M 1/7255;
(Continued)

(56) References Cited

U.S. PATENT DOCUMENTS 7,085,374 B2 8/2006 Schulz
9,167,342 B2 * 10/2015 Ahgren ................ H04R 3/002
(Continued)

*Primary Examiner* — Norman Yu
(74) *Attorney, Agent, or Firm* — Edell, Shapiro, Finnan, LLC

(57) ABSTRACT

A controller for the conference session generates a speaker signal for speakers in a conference room. The controller correlates the speaker signal with network timing information and generates speaker timing information. The controller transmits the correlated speaker signal and timing information to a mobile device participating in the conference session. The mobile device generates an echo cancelled microphone signal from a microphone of the mobile device, and transmits the echo cancelled signal back to the controller. The controller also receives array microphone signals associated with an array of microphones at known positions in the room. The controller estimates a relative location of the mobile device within the conference room. The controller dynamically selects as audio output corresponding to the mobile device location either the echo cancelled microphone signal from the mobile device or an echo cancelled array microphone signal associated with the relative location of the mobile device.

20 Claims, 7 Drawing Sheets

(51) Int. Cl.
*H04M 3/56* (2006.01)
*G10K 11/178* (2006.01)
*H04R 3/00* (2006.01)
*H04R 3/02* (2006.01)
*H04B 1/38* (2015.01)
*H04W 88/02* (2009.01)

(52) U.S. Cl.
CPC .............. *H04R 3/005* (2013.01); *H04R 3/02* (2013.01); *G10K 2210/108* (2013.01); *G10K 2210/3018* (2013.01); *G10K 2210/3023* (2013.01); *H04M 2203/509* (2013.01); *H04M 2207/18* (2013.01); *H04W 88/02* (2013.01)

(58) Field of Classification Search
CPC ....... H04M 2203/509; H04M 2207/18; H04M 3/2236; H04M 9/08; H04M 1/6066; H04M 2250/06; H04M 2250/62; H04R 3/005; H04R 2499/11; H04R 2410/05; H04R 2460/01; H04R 3/00; H04R 25/554; H04R 29/004; H04R 2430/20; H04R 1/326; H04R 2201/107; H04R 2410/01; H04R 29/006; G10L 2021/02166; G10L 21/0208; G10L 21/0272; G10L 21/02; G10L 21/0232; G10L 25/78; G10L 2021/02165; G10L 2021/02082; G10K 11/002; G10K 2210/108; G10K 2210/3023; H04B 3/20
USPC ........ 381/315, 56, 71.1, 122, 73.1, 93, 94.1, 381/94.7; 455/570, 114.2; 379/406.01, 379/202.01, 406.03; 370/286, 289, 260
See application file for complete search history.

(56) References Cited

U.S. PATENT DOCUMENTS

| | | | |
|---|---|---|---|
| 2007/0116254 A1* | 5/2007 | Looney | H04M 9/082 379/406.01 |
| 2008/0247559 A1 | 10/2008 | Wang | |
| 2008/0304653 A1 | 12/2008 | Ghani et al. | |
| 2013/0002797 A1* | 1/2013 | Thapa | H04M 3/002 348/14.01 |
| 2014/0019247 A1* | 1/2014 | Melanson | H04M 1/72572 705/14.58 |
| 2015/0050967 A1 | 2/2015 | Bao et al. | |

* cited by examiner

ACOUSTIC ECHO CANCELLATION FOR AUDIO SYSTEM WITH BRING YOUR OWN DEVICES (BYOD)

CROSS REFERENCE TO RELATED APPLICATIONS

This application is a continuation of U.S. patent application Ser. No. 13/967,687, entitled "Acoustic Echo Cancellation for Audio System with Bring Your Own Devices (BYOD)" and filed on Aug. 15, 2013, the entirety of which is incorporated herein by reference.

TECHNICAL FIELD

The present disclosure relates to audio control in conferences with Bring Your Own Devices (BYODs).

BACKGROUND

The ability to "Bring Your Own Device" (BYOD) is a desired feature for more and more video conferencing systems. With BYOD, meeting participants are able to use their own devices such as laptops, tablets, and cell phones to send/receive video and audio while participating in the conference. If a participant has his own device, the microphone on the device may be used to pick up good audio signal as the microphone is closer to the talking participant. The acronym BYOD will be used to refer to the actual device that a meeting participant may bring to a conference session.

Acoustic echo cancellation (AEC) has several challenges when audio from microphones on BYODs is involved. The number of BYODs may change dynamically during a meeting/conference session, and consequently the computation power requirement of AEC changes. The processer of the audio system used for the conference session may not have enough computation power to support AEC for both array microphones used in audio system (and positioned in a conference room) and BYOD microphones. The audio system receives audio signals from BYOD microphones through a digital network. The signal from each BYOD has a different delay, depending on network conditions. Additionally, each BYOD has its own microphone signal sampling clock that may be different from the sampling clock of loudspeaker of the conference audio system. Speaker signals and BYOD microphone signals need to be aligned accurately and the clock differences have to be compensated for AEC to perform well.

DESCRIPTION OF EXAMPLE EMBODIMENTS

Overview

Techniques are presented herein to improve acoustic echo cancellation in a conference/meeting session in which one or more BYODs (i.e., mobile devices) are participating. A controller for the conference session receives at least one audio signal from a remote end to be played on a local loudspeaker and used as a reference signal for AEC. The controller correlates the speaker signal with network timing information to generate speaker timing information. The controller transmits the speaker signal with the speaker timing information via a network to a mobile device that is participating in the conference session. This enables the mobile device to cancel echo from the microphone signal of the mobile device, and transmit the echo cancelled microphone signal back to the controller. The controller also receives array microphone signals associated with an array of microphones at corresponding known positions in the room. The controller removes acoustic echo from the plurality of array microphone signals, and estimates a relative location of the mobile device with respect to one or more of the array microphones. The controller pairs the mobile device with one or more of the array microphones based on the relative location of the mobile device, and dynamically selects transmitting audio output corresponding to the mobile device location either (a) the array microphone signal associated with the one or more array microphones to which the mobile device is paired, or (b) the echo cancelled microphone signal derived from the microphone of the mobile device.

EXAMPLE EMBODIMENTS

Acoustic Echo Cancellation (AEC) is the process of removing an echo generated by loudspeakers (simply referred to as "speakers") in the vicinity of microphones. AEC works by comparing the signal received from the microphone with the signal sent to the speaker (referred to as a speaker signal), and removing the estimated echo of the speaker signal from the signal received from the microphone. Since AEC works best when the microphone signal and speaker signal are aligned in time and with synchronized sampling frequency, knowledge of this timing is important for proper AEC. Echo cancellation is generally a computationally intensive process, and as the number of BYODs participating in a conference session increases, so does the computation burden for AEC increase. Moreover, BYOD participants may leave and join a conference session, so that the number of BYODs may change dynamically during the conference session, which further complicates the AEC. Accordingly, techniques are presented herein to establish a common timing base between BYODs and the conference system controller to allow each BYOD to perform local AEC on its own microphone signal, removing the burden from the conference system controller. The common timing base is established through a network timing protocol.

Figure 1:
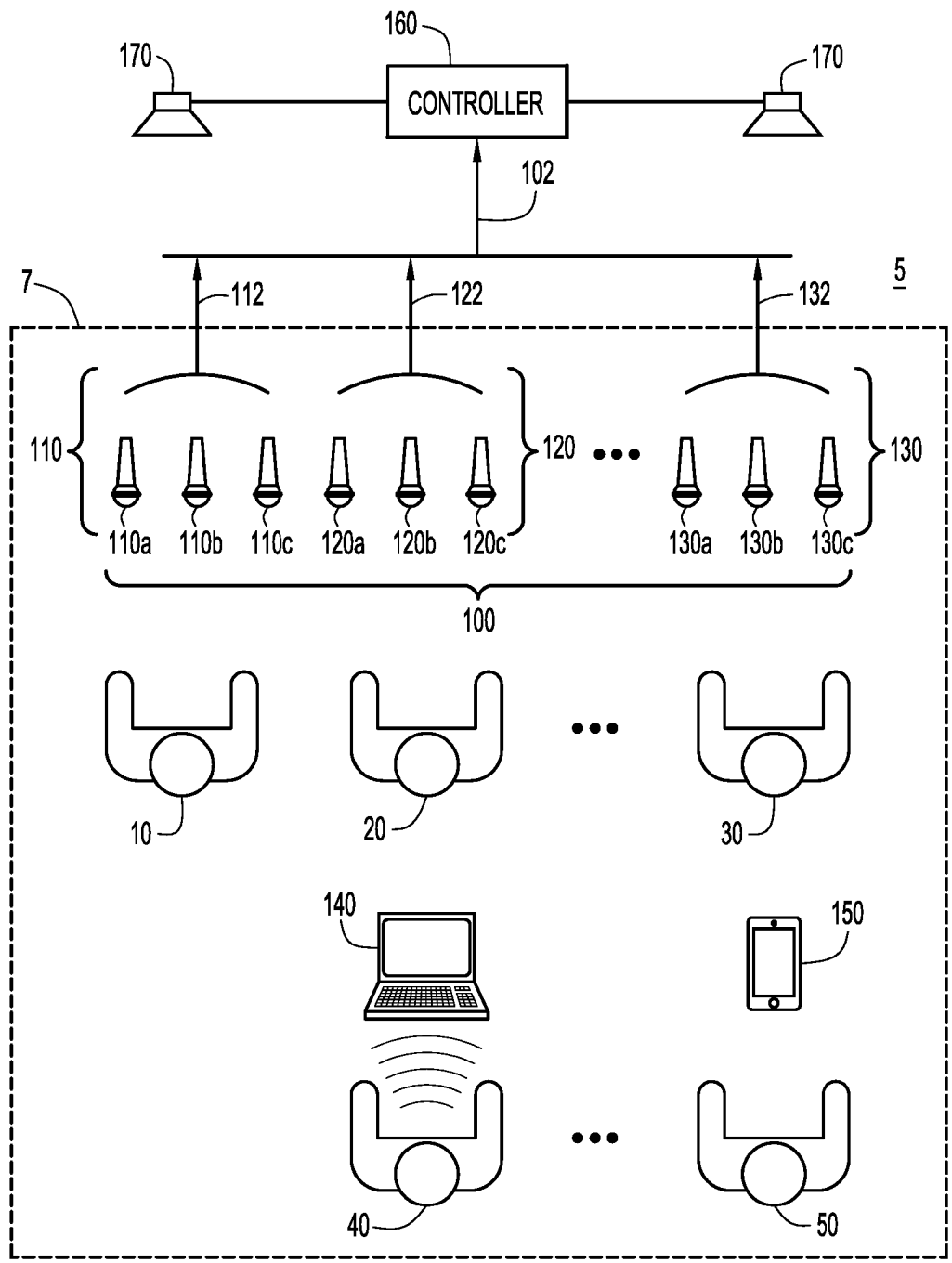
FIG. 1 is a high level diagram of a conference system in which there are participants in a conference session that are using BYODs, and in which system the acoustic echo cancellation techniques presented herein may be employed.

Referring now to FIG. 1, a conference system 5 is shown that supports a conference session in a conference room 7 with participants 10, 20, 30, 40, and 50. While only five participants are specifically shown, the conference session may include any number of participants. In this example, participants 40 and 50 are using their own devices, i.e., BYODs, and are depicted as sitting toward the back of the conference room 7. Specifically, participant 40 is using a laptop 140 and participant 50 is using a smartphone 150. BYODs are not limited to these examples, and may take any form of computing device (e.g., tablet, etc.) with a processor, network interface, and a microphone. BYODs are also not limited to the two depicted devices, and in general there are D BYODs, where D represents a number that may change as participants log on/off (join and depart) during the conference session.

There is a microphone array 100 in the conference room 7 to capture audio from the participants in the conference room. For example, participants' microphones 110*a*, 110*b*, and 110*c* are grouped into sub-array 110 that is in front of participant 10. Similarly, microphones 120*a*, 120*b*, and 120*c* are grouped into sub-array 120 that is in front of participant 20, and microphones 130*a*, 130*b*, and 130*c* are grouped into sub-array 130 that is in front of participant 30. All of the sub-arrays of microphones of microphone array 100 cover the entirety of the conference room 7. Though three sub-arrays are shown, in general there are S sub-arrays made up of M total microphones, where S>M.

Sub-arrays 110, 120, and 130 produce array microphone signals 112, 122, and 132, respectively. Array microphone signals 112, 122, and 132 are aggregately shown at reference numeral 102, and supplied to a conference system controller 160 for further processing. Speakers 170 are distributed at various positions around the conference room 7, and output sound from the conference session audio from the remote participants in the conference session. While one example is shown in FIG. 1, other configurations of array microphones are envisioned (e.g., single microphone for each participant, shared microphone arrays for more than one participant, etc.). As a general example, S sub-arrays produce S "channels" of array microphone signals.

Figure 2:
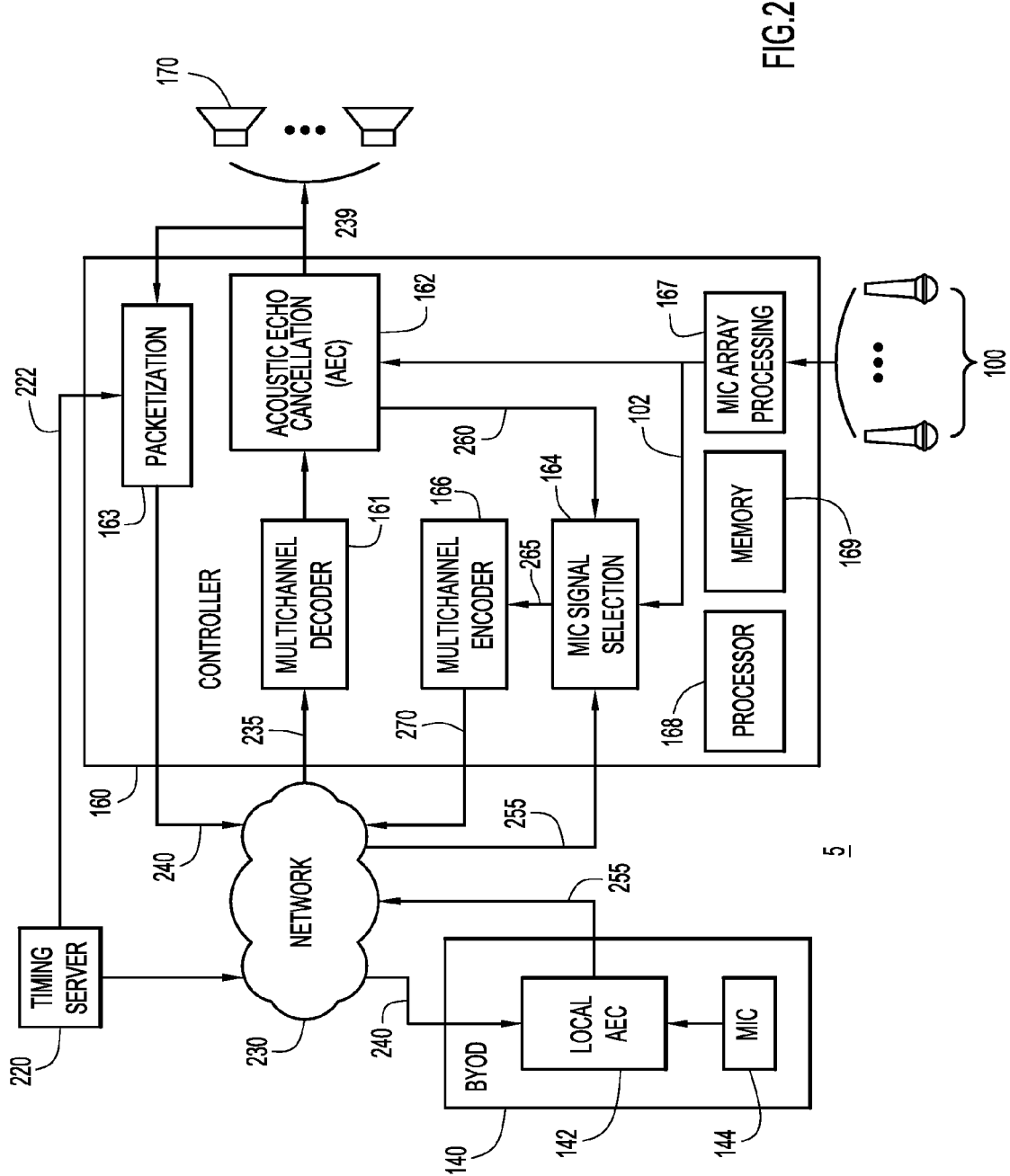
FIG. 2 is a block diagram of the components of the conference system.

Reference is now made to FIG. 2. FIG. 2 shows a block level diagram of the conference system, and showing more details of the laptop BYOD 140 and the controller 160. The BYOD 140 includes local AEC logic 142 and a microphone (MIC) 144. The microphone 144 detects audio from the user of the BYOD 140 (and ambient surroundings) and the local AEC logic 142 performs local AEC at the BYOD 140. Further details of the AEC logic 142 are described hereinafter in connection with FIG. 3.

The controller 160 includes a multichannel decoder 161, an AEC logic block 162, packetization logic 163, MIC signal selection logic 164, a multichannel encoder 166 and MIC array processing logic 167. The controller 160 also includes a processor (e.g., microcontroller or microprocessor) 168, or several processors, and memory 169. The processor 168 is configured to control operations of the controller 160 for the conference session, and in so doing, may execute one or more software programs stored in memory 169. Also, data representing audio generated during the conference session may be stored in memory 169. The functional blocks 161-167 of the controller shown in FIG. 2 may be embodied by dedicated or combined application specific integrated circuits (ASICs) containing digital logic. Alternatively, one or more of the functional blocks 161-167 may be embodied by software stored in memory 169 and executed by the processor 168.

Memory 169 may comprise read only memory (ROM), random access memory (RAM), magnetic disk storage media devices, optical storage media devices, flash memory devices, electrical, optical, or other physical/tangible memory storage devices. The processor 168 is, for example, a microprocessor or microcontroller that executes instructions for any of the logic described in controller 160. Thus, in general, the memory 169 may comprise one or more tangible (non-transitory) computer readable storage media (e.g., a memory device) encoded with software comprising computer executable instructions and when the software is executed (by the processor 168) it is operable to perform the operations described herein.

The BYOD 140 enters the conference room where the conference session is occurring and obtains a network connection, via network 230, in order to participate in the meeting, and also to connect with the controller 160. The conference session may be a Telepresence session or any audio/video conference session. The network 230 is meant to represent one or more networks, such as a local area network, wide area network, wireless local area network, wireless wide area network, etc.

The controller 160 connects/communicates with a timing server 220 in order to synchronize its processing of audio and other data with respect to a centralized timing reference supplied by the timing server. In one example, network timing server 220 is a component of controller 160, but in an alternative example, the timing server 220 may be a separate component that is coupled to controller 160 through network 230. For example, the timing server 220 is a Network Timing Protocol (NTP) timing server. The timing server 220 generates timing information 222 that is supplied to the controller 160.

Remote sites, not shown in FIG. 2, also communicate with controller 160 through network 230. The remote sites send encoded audio data 235 to controller 160. Similarly, controller 160 sends encoded, echo-cancelled audio data 270 to the remote sites. Typically, remote audio data 235 and echo-cancelled audio data 270 both comprise a number of channels representing different areas of the respective conference rooms. As a general example, audio data 235 and echo-cancelled audio data 270 comprise S audio channels corresponding to the S sub-array microphone channels. Video data may also be communicated back and forth between controller 160 and the remote sites. In this example, the remote sites may be other conference session controllers or a central server that routes data between session controllers. Only one controller, associated with the participants in one conference room, will be described herein, for simplicity.

Controller 160 receives encoded audio data 235 from a remote site and the multichannel decoder 161 decodes the received encoded audio data 235. The AEC logic 162 processes the decoded signal and array microphone signal 102 to generate a speaker signal 239. Speaker signal 239 is supplied as output to speakers 170 in order to project audio into the conference room and is also sent to packetization logic 163. Using the timing information 222, the packetization logic 163 associates a time stamp with each packet of audio data that describes the time that audio data was played through speakers 170.

After associating speaker signal 239 with timing information contained in the signal 222, packetization logic 163 sends a combined speaker and timing data 240 to laptop BYOD 140 over network 230. Laptop BYOD 140 receives the combined speaker and timing data 240, and the local AEC module 142 uses that signal to remove the acoustic echo from the signal from laptop microphone 144 and in so doing produces an echo cancelled BYOD microphone signal

255, as will be described below with respect to FIG. 3. Laptop BYOD 140 returns echo cancelled BYOD microphone signal 255 to controller 160 over network 230.

Still referring to FIG. 2, array microphone 100 sends array microphone signal 102 to controller 160, where microphone array processing logic 167 performs preliminary processing. In one example, microphone array processing logic 167 provides information as to the physical location in the room that each sub-array 110, 120, 130 is recording. This is particularly useful in multi-display conference rooms, where a person on the left side of the room should be heard from the left side speakers, and not from the right side speakers. Since the sub-arrays 110, 120, 130 of array microphone 100 have been placed in a specific position, the sound from each array can be encoded so that it is played from the corresponding position at the remote site. Microphone array processing logic 167 may perform other functions, such as signal-to-noise ratio (SNR) estimation and high/low frequency signal strength estimation. In one example, after being processed by microphone array processing logic 167, microphone data 102 comprises audio data, SNR data, and high/low frequency signal strengths from each of the sub-arrays in array microphone 100.

AEC logic 162 uses speaker signal 239 to remove the acoustic echo in array microphone signals 102 and generates echo cancelled array microphone signal 260. In one example, only the audio portions of array microphone signal 102 is sent to AEC logic 162. Signal 260 is a grouping of echo cancelled microphone signals, associated with microphone sub-arrays 110, 120, and 130 that have captured all of the sound in the room, that indicates what position each signal originated from. Microphone signal selection logic 164 receives echo cancelled BYOD microphone signal 255, echo cancelled array microphone signal 260, and array microphone signal 102 and determines which echo cancelled signal to include in the outgoing streams, as will be further described hereinafter with reference to FIGS. 4 and 5. In one example, only the SNR data and/or the high/low frequency signal strength portions of array microphone signal 102 are sent to microphone signal selection logic 164. After selection logic 164 has selected the best microphone signals it forms echo cancelled output signal 265. Multichannel encoder 166 encodes output signal 265 to generate the aforementioned echo-cancelled audio data 270 for transmission to the remote sites that are participating in the conference session.

Figure 3:
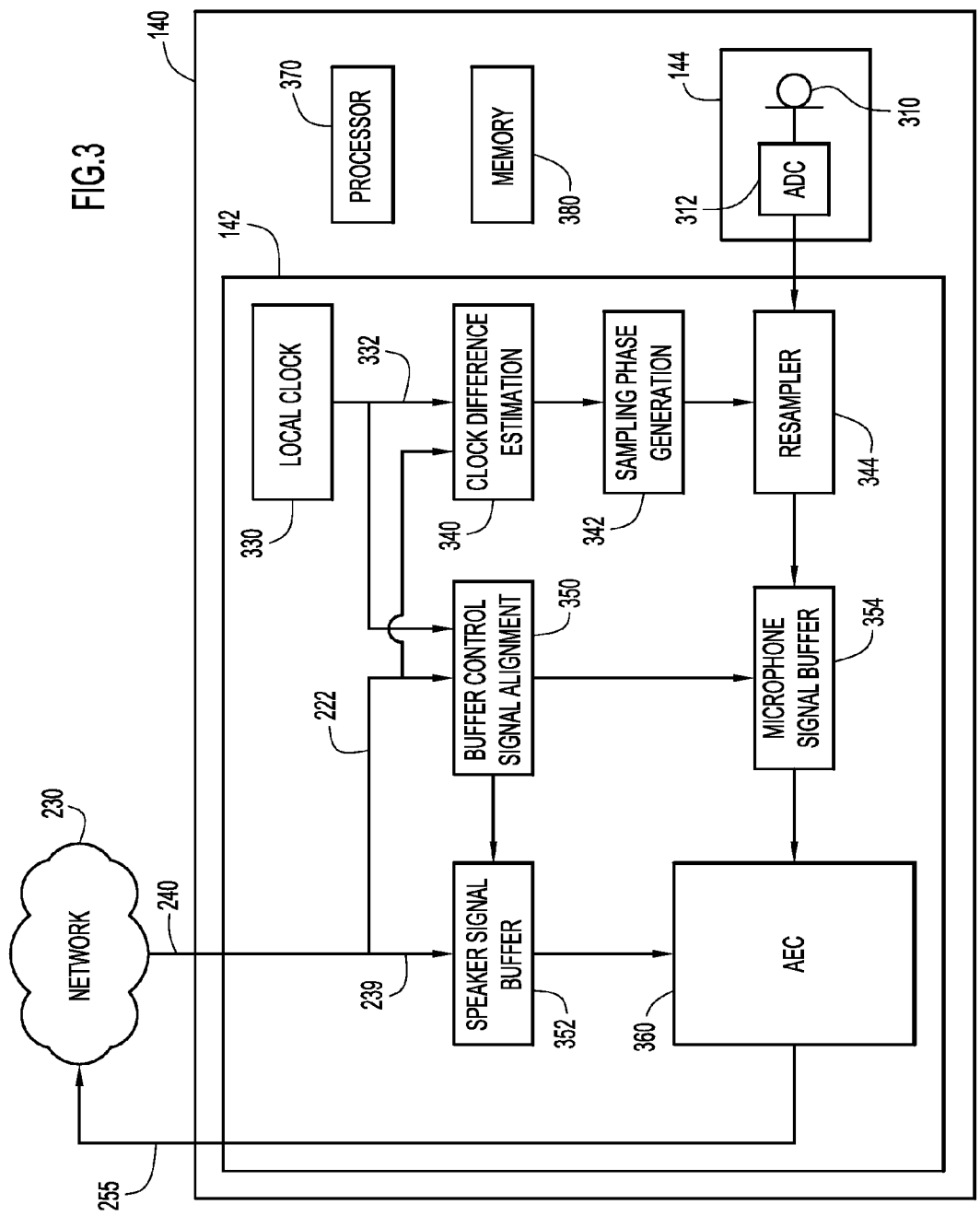
FIG. 3 is block diagram of a BYOD configured to participate in the acoustic echo cancellation techniques presented herein.

Referring now to FIG. 3, the laptop BYOD 140 is shown in more detail. The laptop BYOD 140 includes local AEC module 142 and BYOD microphone 144. The BYOD microphone 144 further includes condenser 310 that converts sounds into analog electrical signals and analog-to-digital converter (ADC) 312 to convert the analog signals into digital signals. Local AEC module 142 includes local clock 330, clock difference estimation logic block 340, sampling phase generation logic block 342, resampler 344, buffer control signal alignment logic block 350, speaker signal buffer 352, microphone signal buffer 354, and local AEC logic block 360. The laptop BYOD 140 also includes a processor (e.g., microcontroller or microprocessor) 370, or several processors, and memory 380. The processor 370 is configured to control operations of the laptop BYOD 140 for the conference session, and in so doing, may execute one or more software programs stored in memory 380. Also, data representing audio generated by the BYOD 140 during the conference session may be stored in memory 380. The functional blocks 340, 342, 344, 350, and/or 360 of the laptop shown in FIG. 3 may be embodied by dedicated or combined application specific integrated circuits (ASICs) containing digital logic. Alternatively, one or more of the functional blocks 340, 342, 344, 350, and/or 360 may be embodied by software stored in memory 380 and executed by the processor 370.

Memory 380 may comprise read only memory (ROM), random access memory (RAM), magnetic disk storage media devices, optical storage media devices, flash memory devices, electrical, optical, or other physical/tangible memory storage devices. The processor 370 is, for example, a microprocessor or microcontroller that executes instructions for any of the logic described in BYOD 140. Thus, in general, the memory 380 may comprise one or more tangible (non-transitory) computer readable storage media (e.g., a memory device) encoded with software comprising computer executable instructions and when the software is executed (by the processor 370) it is operable to perform the operations described herein.

In operation, BYOD laptop 140 receives the combined speaker and timing data 240 from network 230, which enables local AEC module 142 to effectively remove the acoustic echo from audio picked up by microphone 144 in laptop 140. In one example, AEC module 142 performs two separate preliminary operations before removing the acoustic echo. One preliminary operation aligns the speaker signal and the microphone signal to ensure that the signals are not shifted in time. A second preliminary operation synchronizes the local clock on the laptop to the master clock associated with the speakers. Both of these preliminary operations allow for faster and more accurate acoustic echo cancellation.

Since the local laptop clock 330 may run slightly faster or slower than the clock associated with the speaker, the sampling frequency of the local microphone and the speaker may be slightly different. ADC 312 samples condenser 310 at a frequency governed by local clock 330. While local clock 330 may be periodically synchronized to timing server 220, it may run at a slightly faster or slower frequency between the synchronization events. Clock difference estimation logic 340 receives both speaker timing information 222 and local clock timing information 332 and compares the two timing data to estimate any difference in clock frequency. Sampling phase generation logic 342 takes the clock difference and generates a sampling phase for resampler 344. In one example, fractional variable delay phase FIR filters, such as Farrow structures, may be used as resampler 344. Resampler 344 resamples the audio signal from local microphone 144 at the same frequency as speaker signal 239, and stores the resampled microphone signal in microphone signal buffer 354.

Additionally, since the latency of network 230 is unknown and not necessarily constant, the speaker signal may be received at a variable time difference from the time that the local microphone signal is recorded. Module 142 receives combined speaker and timing data 240 and sends speaker signal 239 to speaker signal buffer 352. Speaker timing information 222 goes to buffer control alignment logic 350, along with local clock timing information 332 corresponding to the local microphone signal. Buffer control alignment logic 350 aligns the local microphone signal and the speaker signal so that the variable time difference is removed. Local AEC logic 360 receives the synchronized, aligned speaker and local microphone signals and removes any acoustic echo from the local microphone signal. AEC module 142 then transmits echo cancelled BYOD microphone signal 255 to controller 160 over network 230.

Figure 4:
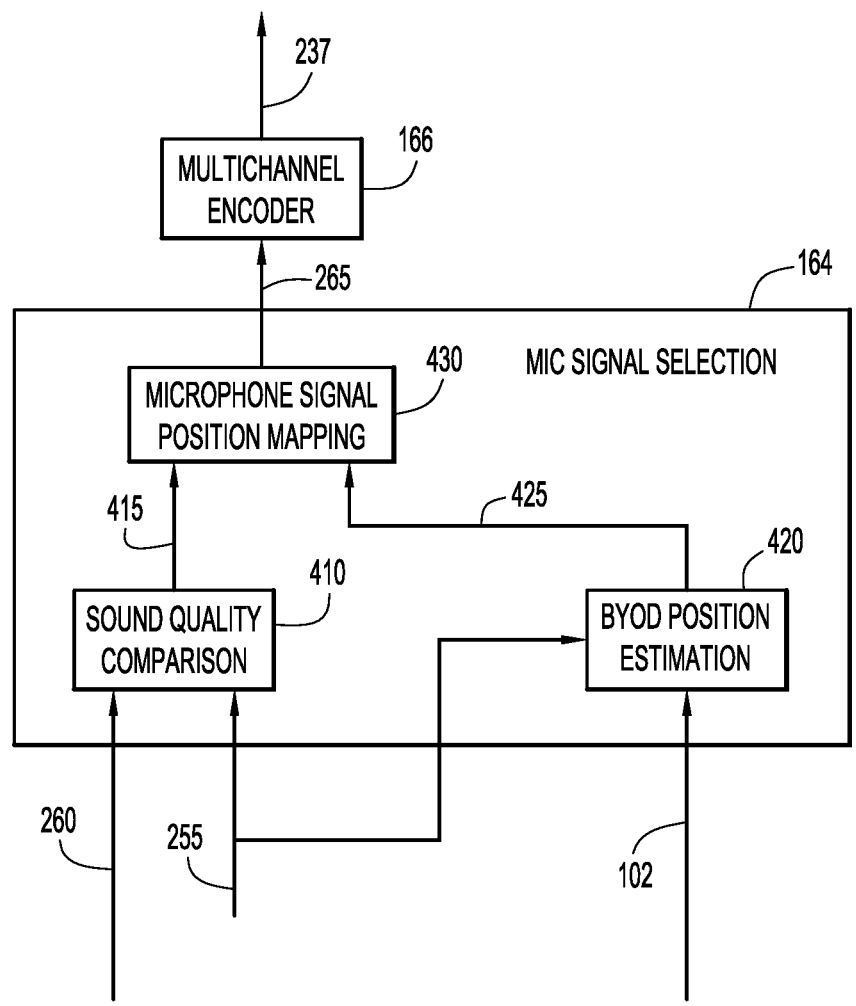
FIG. 4 is a flow diagram generally illustrating microphone selection and position mapping logic in a controller of the conference system.

Referring now to FIG. 4, further details of the microphone signal selection logic 164 are now described. Microphone signal selection logic 164 receives echo cancelled BYOD microphone signal 255 and echo cancelled array microphone signal 260. In one example, signal 255 comprises D channels of echo cancelled BYOD microphone signals from D plurality of different BYODs. Signal 260 comprises channels from multiple sub-arrays 110, 120, and 130. Microphone Selection logic 164 performs sound quality comparison at 410 to compare BYOD microphone signal 255 to the channels in echo cancelled array microphone signal 260 and determines which signal (signal 255 or signal 260) has a higher quality sound. Upon determining which signal has the better sound quality (for a particular BYOD), echo cancelled microphone signal 415 comprising the higher quality channels is generated. In general, signal 415 consists of S channels of echo cancelled microphone signals, corresponding to the S array microphone sub-arrays.

A "higher" quality signal may be based on a variety of criteria. In one example, a higher quality sound is determined by a fuller frequency spectrum, and not solely by higher amplitude. For example, a laptop microphone will typically have a higher amplitude signal for the user of that laptop, since he or she is closer to the laptop microphone than to an array microphone. However, an array microphone, being a specialized microphone, may provide a fuller frequency spectrum than a laptop microphone, which is typically of lower quality. In this example, a fuller frequency spectrum, and a higher quality sound, comprises an audio signal with a higher amplitude at high and low frequencies. A lower quality audio signal comprises a signal that concentrates more on mid-range frequencies, and does not record the extreme high and low frequencies as well.

Still referring to FIG. 4, the BYOD microphone signal 255 and array microphone signal 102 with channels corresponding to sub-arrays 110, 120, and 130 are received and at 420 an estimate is made of the position of laptop BYOD 140, as will be described below with reference to FIG. 5. In one example, only the SNR data and the high/low frequency data portions of array microphone signal 102 are sent to microphone signal selection logic 164 in order to estimate the position of laptop BYOD 140. This position estimation information in encoded in BYOD position signal 425. At 430, the BYOD position signal 425 and echo cancelled microphone signal 415 are used to map the BYOD microphone to an array microphone and produce output signal 265 representing that mapping. Output signal 265 is encoded by multichannel encoder 166 and transmitted as the aforementioned encoded echo-cancelled audio data 270 to the remote site(s) over network 230.

With reference to FIG. 2, encoded echo-canceled audio data 270 comprises output streams corresponding to the locations of sub-arrays 110, 120, and 130. However, with the processing of microphone signal selection logic 164, if laptop microphone 144 produces a higher quality sound than that from sub-arrays 110, 120, and 130, then echo cancelled BYOD signal 255 from laptop microphone 144 is used. Microphone signal selection logic 164 also ensures that BYOD signal 255 is substituted for the appropriate sub-array signal, so that when it is played at the remote site, the audio appears to come from the appropriate physical location within the conference room. In other words, if participant 40 is sitting on the left side of the room, BYOD signal 255 would be played from the left side speakers.

Figure 5:
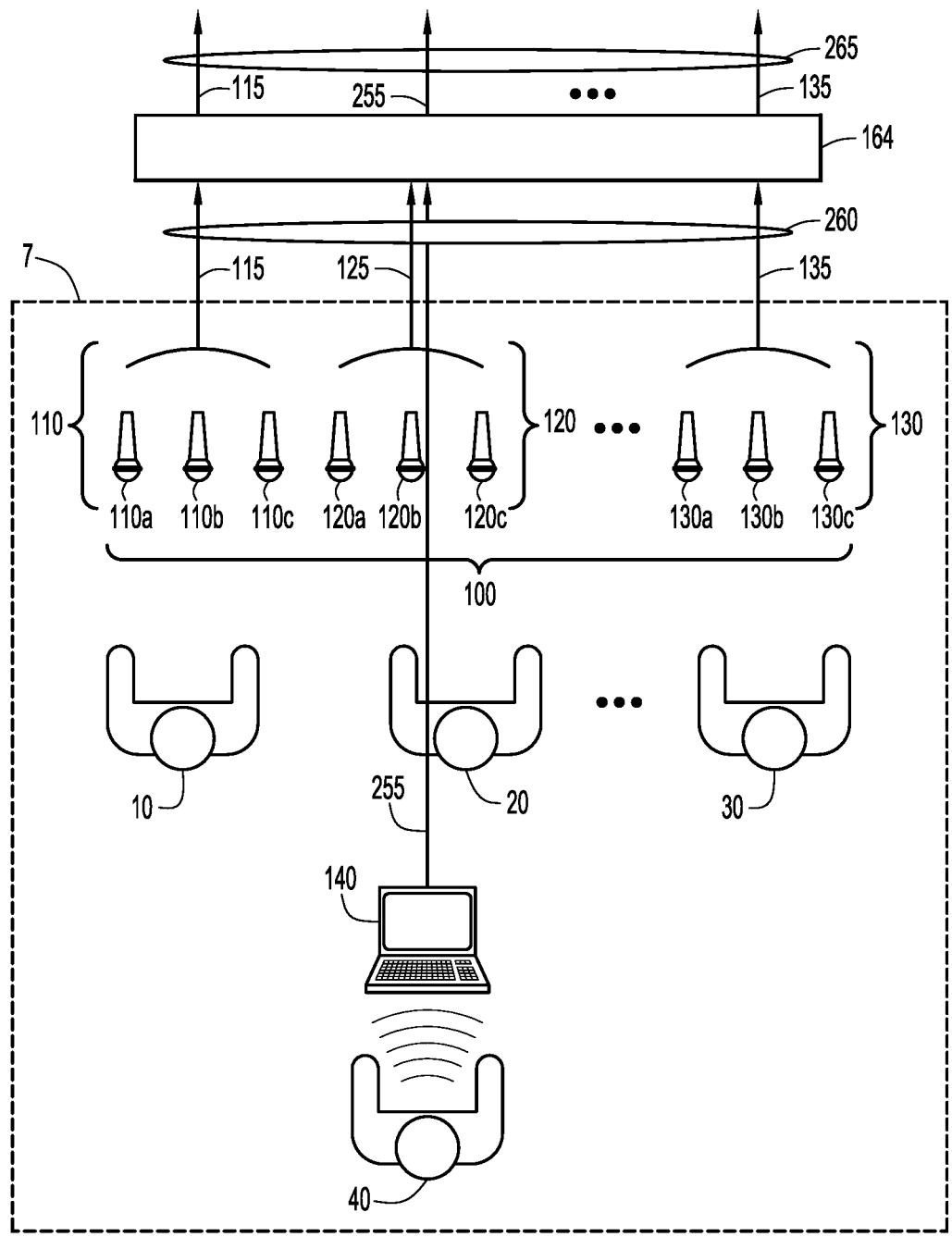
FIG. 5 is diagram graphically illustrating the swapping/switching of an echo canceled BYOD microphone signal for an array microphone signal at a corresponding position.

Referring now to FIG. 5, an example of the operations of the microphone selection logic 164 substituting the audio from laptop BYOD 140 is now described. In this example, participant 40 associated with laptop BYOD 140 is located behind participant 20 within the conference room 7. When participant 40 speaks, the audio is captured by the microphone in laptop BYOD 140 and the microphone 120 sub-array. The other sub-arrays 110 and 130 may also capture the audio from participant 40, but sub-array 120 captured the audio best among the sub-arrays. After acoustic echo cancellation (not shown in FIG. 5), signal 260 with channels 115, 125, and 135 and BYOD microphone signal 255 are sent to microphone selection logic 164. Since sub-array 120 captured the audio most clearly (among the sub-arrays), laptop BYOD 140 is determined to be in the vicinity of that sub-array (e.g., the center of the room). Microphone selection logic 164 compares BYOD signal 255 with echo cancelled signal 125 from sub-array 120 and determines that BYOD signal 255 provides higher quality audio. In producing output signal 265, selection logic 164 substitutes sub-array signal 125 with BYOD signal 255, as shown in FIG. 5.

Figure 6A:
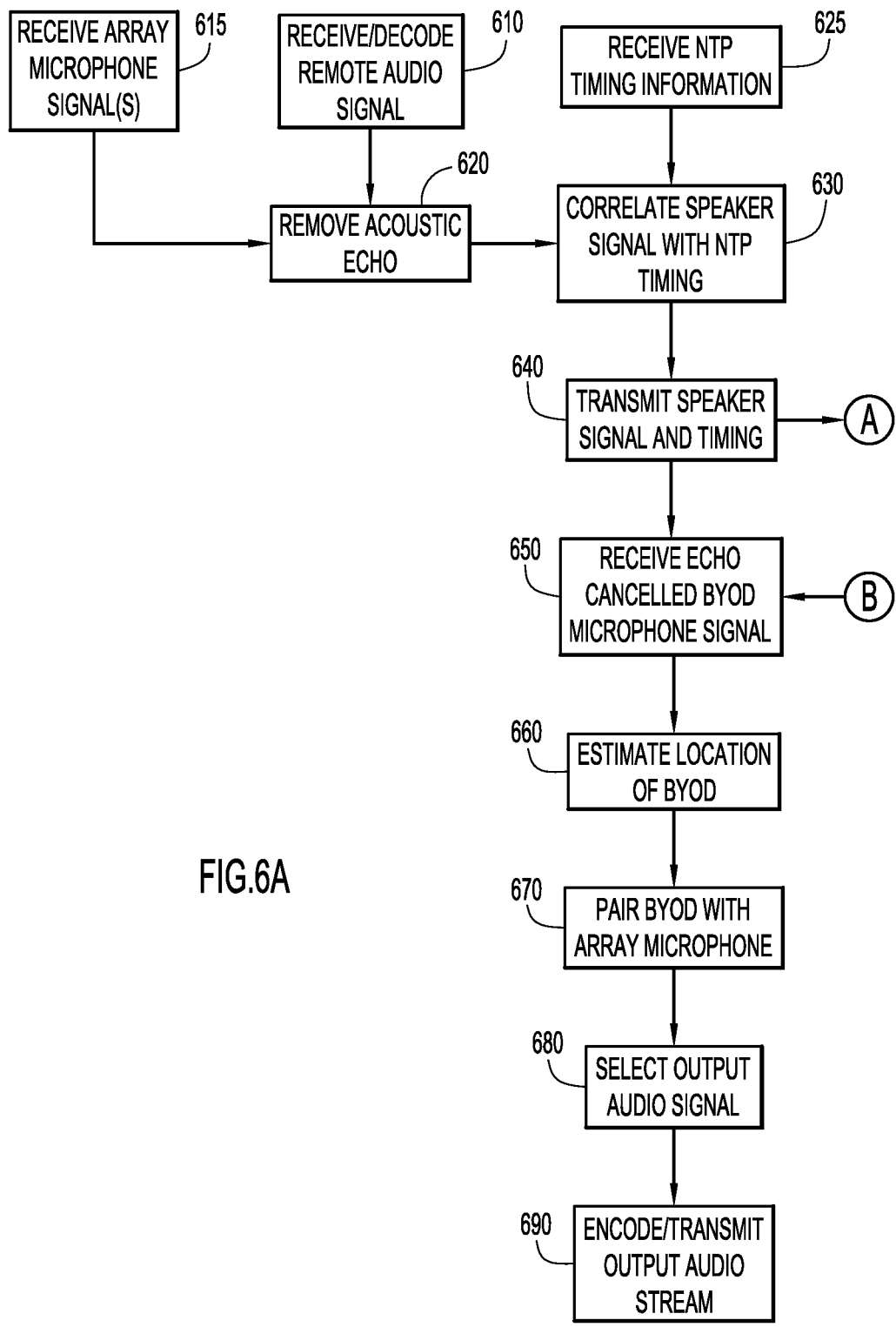
FIG. 6A is a flowchart of operations performed in the conference system controller for processing audio for a conference session in accordance with the techniques presented herein.

Referring now to FIG. 6A and together with FIG. 2, a flowchart for the operations performed at the controller 160 is now described. In step 610, the controller 160 receives and decodes audio signal 235 from a remote site that is to be played in the conference session room. At step 615, the controller 160 receives array microphone signal 102 that has captured any audio from the conference room 7, including audio output over speakers 170, which may cause an echo. Audio signal 235 and array microphone signal 102 are processed by controller 160 at step 620, producing speaker signal 239 and echo cancelled array microphone signal 260, thereby removing any echo from the array microphone signals. Controller 160 receives timing information 222 at step 625 from timing server 220. If controller 160 is acting as a timing server, then timing information 222 is generated from its own internal clock. At step 630, the speaker signal 239 is correlated to the timing information 222 and sent to speakers 170. This step provides information regarding the specific time that audio played in the conference room. After correlating speaker signal 239 and timing information 222, the controller 160 transmits the combined speaker and timing data 240 to every BYOD that has registered with controller 160 for the conference session.

Controller 160 receives an echo cancelled BYOD microphone signal 255 from a BYOD at step 650, and compares echo cancelled BYOD microphone signal 255 with array microphone signal 102. Based on this comparison, controller 160 estimates the position of the BYOD in step 660. In step 670, controller 160 pairs the BYOD with the echo cancelled sub-array microphone channel that best fits the position of the BYOD. Based on a comparison of the sound quality between the echo cancelled BYOD microphone signal 255 and the paired echo cancelled sub-array microphone signal, controller 160 selects the higher quality signal (either the echo cancelled BYOD microphone signal or the echo cancelled sub-array microphone signal) and generates output signal 265 at step 680. In step 690, controller 160 encodes output signal 265 to produce encoded signal 270 and transmits signal 270 over network 230 to the remote sites.

Figure 6B:
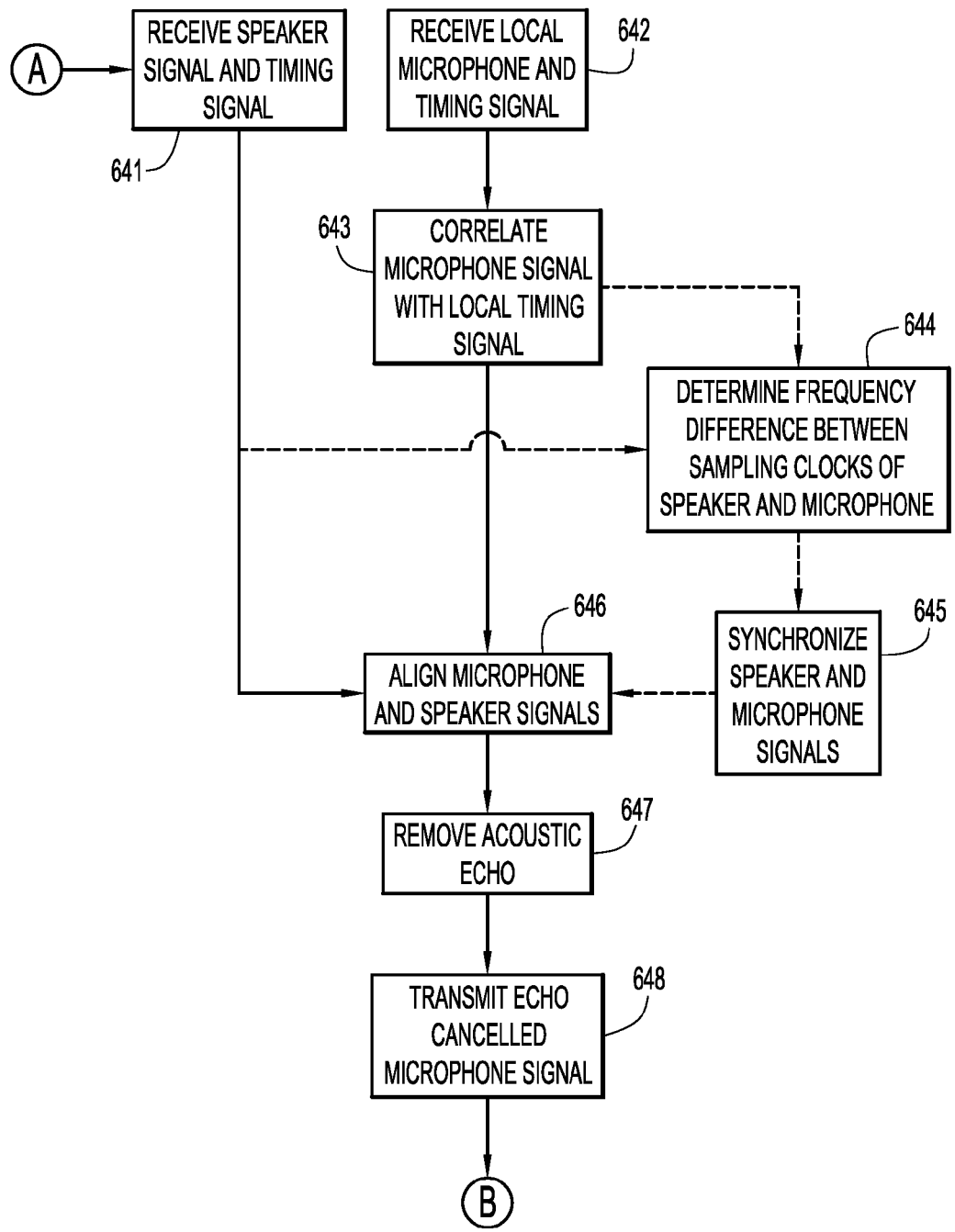
FIG. 6B is a flowchart of operations performed in the BYOD using audio from the local microphone of the BYOD, in accordance with the techniques presented herein.

Referring now to FIG. 6B and together with FIGS. 2 and 3, the operations performed at a BYOD, for example laptop 140, are described. When laptop BYOD 140 receives combined speaker and timing data 240 at step 641, AEC module 142 prepares to remove an acoustic echo from the audio captured by local microphone 144. In step 642, AEC module 142 receives local timing information 342 from its local clock 340, as well as an audio signal from laptop microphone 144. AEC module 142 correlates the local microphone signal with the local timing information at step 643. If the network and local clocks run at the same frequency, after AEC module 142 has both speaker and microphone signals with their respective timing information, it may proceed to align the signals via buffer management in step 647. However, if the sampling frequencies differ, AEC module 142 performs the steps of determining the difference between the microphone and speaker sampling frequencies at step 644. After generating a sampling phase based on the difference in sampling frequencies, the AEC module 142 may resamples the local microphone signal at step 645 to synchronize the speaker and microphone signals.

In step 646, the AEC module 142 aligns the local microphone signal and the speaker signal through buffer management of speaker signal buffer 332 and microphone signal buffer 334. Once the signals are aligned, the AEC module 142 removes any acoustic echo in the local microphone signal at step 647 and generates echo cancelled BYOD microphone signal 255. At step 648, laptop BYOD 140 transmits echo cancelled BYOD microphone signal 255 back to controller 160 via network 230.

To summarize, the flow charts of FIGS. 6A and 6B provide, from the perspective of the conference session controller, a method comprising: receiving at least one audio signal at a controller associated with a conference session; receiving, at the controller, a plurality of array microphone signals associated with an array of microphones at corresponding known positions in a room of the conference session; generating a speaker signal from the at least one audio signal and the plurality of array microphone signals; correlating, at the controller, the speaker signal with network timing information to generate speaker timing information; transmitting the speaker signal with the speaker timing information via a network to a mobile device that is participating in the conference session to enable the mobile device to generate an echo cancelled microphone signal from a microphone of the mobile device; receiving, at the controller, the echo cancelled remote microphone signal; removing an acoustic echo from the plurality of array microphone signals to generate a plurality of echo cancelled array microphone signals; estimating a relative location of the mobile device with respect to one or more of the plurality of array microphones; pairing the mobile device with one or more of the plurality of array microphones based on the relative location of the mobile device; and dynamically selecting as audio output for the mobile device either (a) the echo cancelled array microphone signal associated with the one or more array microphones to which the mobile device is paired or (b) the echo cancelled microphone signal derived from the microphone of the mobile device.

Similarly, in apparatus form, an apparatus is provided comprising: at least one loudspeaker configured to project audio from a speaker signal into a room associated with a conference session; a plurality of microphones configured to capture audio from corresponding positions in the room and generate a plurality of array microphone signals; and a controller configured to: receive at least one audio signal associated with the conference session; receive the plurality of array microphone signals; generate the speaker signal from the at least one audio signal and the plurality of array microphone signals; correlate the speaker signal with network timing information to generate speaker timing information; transmit the speaker signal with the speaker timing information via a network to a mobile device that is participating in the conference session to enable the mobile device to generate an echo cancelled microphone signal from a microphone of the mobile device; receive the echo cancelled remote microphone signal; remove an acoustic echo from the plurality of array microphone signals to generate a plurality of echo cancelled array microphone signals; estimate a relative location of the mobile device with respect to one or more of the plurality of array microphones; pair the mobile device with one or more of the plurality of array microphones based on the relative location of the mobile device; and dynamically select as audio output for the mobile device either (a) the echo cancelled array microphone signal associated with the one or more array microphones to which the mobile device is paired or (b) the echo cancelled microphone signal derived from the microphone of the mobile device.

Similarly, in computer readable storage media form, one or more computer readable storage media encoded with software comprising computer executable instructions and when the software is executed operable to cause a processor to: receive at least one audio signal associated with a conference session; receive a plurality of array microphone signals associated with an array of microphones at corresponding known positions in a room of the conference session; generate a speaker signal from the at least one audio signal and the plurality of array microphone signals; correlate the speaker signal with network timing information to generate speaker timing information; transmit the speaker signal with the speaker timing information via a network to a mobile device that is participating in the conference session to enable the mobile device to generate an echo cancelled microphone signal from a microphone of the mobile device; receive the echo cancelled remote microphone signal; remove an acoustic echo from the plurality of array microphone signals to generate a plurality of echo cancelled array microphone signals; estimate a relative location of the mobile device with respect to one or more of the plurality of array microphones; pair the mobile device with one or more of the plurality of array microphones based on the relative location of the mobile device; and dynamically select as audio output for the mobile device either (a) the echo cancelled array microphone signal associated with the one or more array microphones to which the mobile device is paired or (b) the echo cancelled microphone signal derived from the microphone of the mobile device.

Further still, from the perspective of the BYOD mobile device, a method is provided comprising receiving a speaker signal with corresponding speaker timing information; correlating a microphone signal with network timing information to generate microphone timing information; aligning the microphone signal with the speaker signal using the speaker timing information and the microphone timing information; removing an acoustic echo present in the microphone signal based on alignment of the microphone signal with the speaker signal to generate an echo cancelled microphone signal; and transmitting the echo cancelled microphone signal.

The systems and processes described above allow for conference sessions (e.g., Telepresence sessions, audio/video conference, etc.) to allow Bring Your Own Devices (BYODs) to join and leave at any time in the conference session without significantly affecting the processing needs of the session controller due to acoustic echo cancellation. By receiving a standardized time signal with the speaker signal, each BYOD is able to perform Acoustic Echo Cancellation (AEC) on its own microphone signal, relieving the conference system controller of that processing burden. The conference system controller receives the echo cancelled signals from the BYODs and the room array microphones, and selects the best quality audio to represent the audio of the people in the conference room.

The above description is intended by way of example only. Various modifications and structural changes may be made therein without departing from the scope of the concepts described herein and within the scope and range of equivalents of the claims.

What is claimed is:

1. A method comprising:
   at a controller associated with a conference session, generating a speaker signal for speakers in a conference room of the conference session;
   correlating, at the controller, the speaker signal with network timing information to generate speaker timing information;
   transmitting the speaker signal with the speaker timing information via a network to a mobile device that is participating in the conference session to enable the mobile device to generate an echo cancelled microphone signal from a microphone of the mobile device;
   receiving, at the controller, the echo cancelled remote microphone signal;
   estimating a relative location of the mobile device within the conference room; and
   dynamically selecting an audio output for the mobile device from a group comprising the echo cancelled microphone signal derived from the microphone of the mobile device and an echo cancelled array microphone signal associated with the relative location of the mobile device.

2. The method of claim 1, wherein estimating the relative location of the mobile device comprises comparing the echo cancelled microphone signal with a plurality of array microphone signals generated from an array of microphones in the conference room.

3. The method of claim 2, wherein estimating the relative location of the mobile device comprises mapping a position of the echo cancelled microphone signal to a known position of a particular microphone of the array of microphones based on the comparison of the echo cancelled microphone signal with the plurality of array microphone signals.

4. The method of claim 3, further comprising encoding the audio output for the mobile device in an audio stream as originating from the known position of the particular microphone in the array of microphones.

5. The method of claim 1, wherein dynamically selecting the audio output comprises comparing a remote sound quality for an audio segment contained in the echo cancelled microphone signal to a local sound quality for the audio segment from the echo cancelled array microphone signal associated with the relative location of the mobile device.

6. The method of claim 1, further comprising iteratively using the dynamically selected audio output as at least a portion of the speaker signal.

7. The method of claim 1, wherein the speaker signal comprises a plurality of location-based speaker signals, and further comprising correlating the audio output for the mobile device with a location-based speaker signal corresponding to the estimated relative location within the conference room.

8. The method of claim 1, further comprising transmitting the speaker signal with the speaker timing information to a plurality of mobile devices as each of the plurality of mobile devices joins the conference session.

9. A method comprising:
   at a mobile device, receiving a speaker signal with corresponding speaker timing information from a conference server, wherein the speaker timing information is based on a server clock synchronized to a network timing server through network timing information received at the conference server from the network timing server;
   synchronizing a device clock at the mobile device to the network timing server using network timing information received at the mobile device from the network timing server;
   correlating a microphone signal at the mobile device with the device clock to generate microphone timing information;
   at the mobile device, removing an acoustic echo present in the microphone signal based on the microphone timing information and the speaker timing information, to generate an echo cancelled microphone signal; and
   transmitting the echo cancelled microphone signal from the mobile device to the conference server.

10. The method of claim 9, further comprising:
    determining a speaker sampling frequency associated with the speaker signal from the speaker timing information;
    determining a microphone sampling frequency associated with the microphone signal from the microphone timing information;
    comparing the speaker sampling frequency to the microphone sampling frequency; and
    based on the comparison between the speaker sampling frequency and the microphone sampling frequency, resampling the microphone signal at the speaker sampling frequency to generate a resampled microphone signal.

11. The method of claim 10, wherein removing the acoustic echo in the microphone signal comprises removing the acoustic echo in the resampled microphone signal.

12. The method of claim 9, further comprising communicating with the network timing server to obtain the network timing information.

13. The method of claim 9, wherein removing the acoustic echo present in the microphone signal further comprises aligning the microphone signal with the speaker signal by:
    storing the microphone signal in a first buffer;
    storing the speaker signal in a second buffer;
    comparing the speaker timing information with the microphone timing information to determine a timing offset; and
    adjusting one of the microphone signal in the first buffer or the speaker signal in the second buffer based on the timing offset.

14. The method of claim 9, wherein the mobile device comprises a cellular phone, a laptop computer, or a tablet computer.

15. One or more non-transitory computer readable storage media encoded with software comprising computer executable instructions and when the software is executed operable to cause a processor to:
    receive a speaker signal at a mobile device, the speaker signal including corresponding speaker timing information from a conference server, wherein the speaker timing information is based on a server clock synchronized to a network timing server through network timing information received at the conference server from the network timing server;
    synchronize a device clock to the network timing server using network timing information received from the network timing server;

correlate a microphone signal at the mobile device with the device clock to generate microphone timing information;

remove an acoustic echo present in the microphone signal based on the microphone timing information and the speaker timing information, to generate an echo cancelled microphone signal; and transmit the echo cancelled microphone signal from the mobile device to the conference server.

16. The computer readable storage media of claim 15, further comprising computer executable instructions that cause the processor to:

determine a speaker sampling frequency associated with the speaker signal from the speaker timing information;

determine a microphone sampling frequency associated with the microphone signal from the microphone timing information;

compare the speaker sampling frequency to the microphone sampling frequency; and based on the comparison between the speaker sampling frequency and the microphone sampling frequency, resample the microphone signal at the speaker sampling frequency to generate a resampled microphone signal.

17. The computer readable storage media of claim 16, wherein the computer executable instructions cause the processor to remove the acoustic echo in the microphone signal by removing the acoustic echo in the resampled microphone signal.

18. The computer readable storage media of claim 15, further comprising computer executable instructions that cause the processor to communicate with the network timing server to obtain the network timing information.

19. The computer readable storage media of claim 15, further comprising computer executable instructions that cause the processor to align the microphone signal with the speaker signal by:

storing the microphone signal in a first buffer;

storing the speaker signal in a second buffer;

comparing the speaker timing information with the microphone timing information to determine a timing offset; and adjusting one of the microphone signal in the first buffer or the speaker signal in the second buffer based on the timing offset.

20. The computer readable storage media of claim 15, wherein the mobile device comprises a cellular phone, a laptop computer, or a tablet computer.

\* \* \* \* \*